March 6, 1934.  A. L. MILLER ET AL  1,949,971
BRAKE GAUGE ADAPTER
Filed March 17, 1930
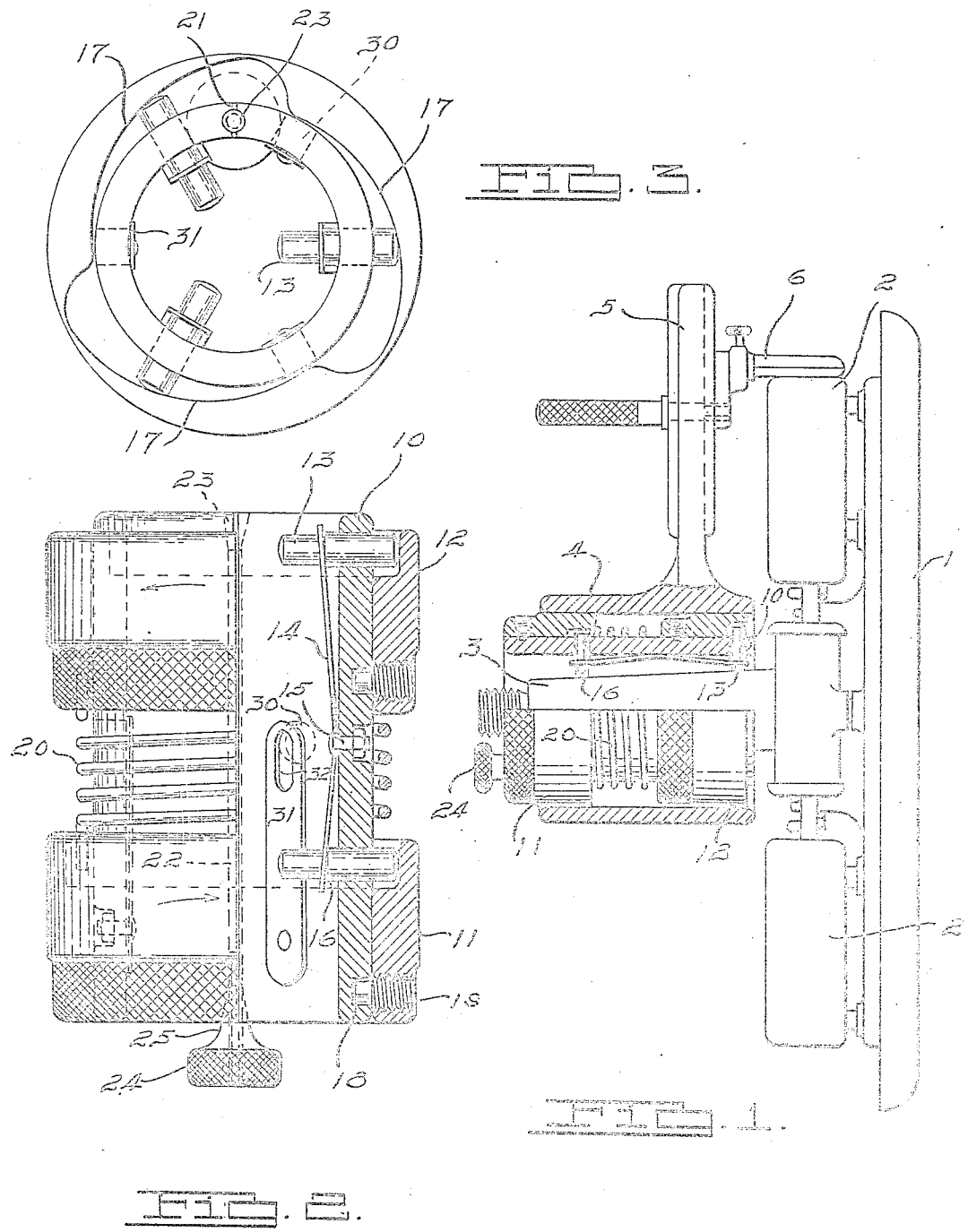
INVENTOR
Alvin L. Miller,
BY Russell H. Miller
ATTORNEY Patented Mar. 6, 1934

1,949,971

UNITED STATES PATENT OFFICE 1,949,971

BRAKE GAUGE ADAPTER

Alvin L. Miller and Russell H. Miller, Detroit, Mich.

Application March 17, 1930, Serial No. 436,518

15 Claims. (Cl. 33—180)

This invention has to do with a gauging device useful for the purpose of initially setting up brakes associated with the wheels of automotive vehicles and for later adjustments necessary because of wear or the relining of the brakes with the friction material. More particularly, the invention is directed to the provision of what may be termed an adapter in the form of a bushing which is capable of adjustment so that the tool can be used with wheel spindles or axle shafts universally regardless of variation in the form or size of the spindles or shafts.

In the accompanying drawing:

Fig. 1 is a composite side elevation in sectional view showing the tool mounted upon a wheel axis in a position for gauging the brake shoes associated with the wheel.

Fig. 2 is a composite sectional view and side elevation of the adapter.

Fig. 3 is an end view thereof.

In Fig. 1 there is shown the usual cover plate 1 of a brake drum showing the brake shoes 2, and at 3 is the spindle or drive shaft. In the event of a front wheel the element 3 is usually a spindle upon which a wheel is to be rotatably mounted. In the event of a rear wheel the element 3 is usually a drive shaft to which a wheel is keyed. In the case of a front wheel drive vehicle the conditions are just reversed. The tool has a hub 4 designed to swivel around the wheel axis a radially extending body 5, and a gauging instrument 6 designed to gauge the brake lining or brake drum, the gauging device being adjustable radially in the body 5. The details of this tool need not be gone into further as the same is covered by our Patent No. 1,898,136 of February 21, 1933.

It will be appreciated that spindles and axle shafts will vary in size, generally with the variation in size and weight of the vehicles, whether passenger vehicles or commercial vehicles. An adapter, which forms the subject matter of the present invention, is provided for use with the tool, so that the tool can be employed with spindles and shafts of all sizes. The variation of the spindles and shaft ends occur in diameter, in available length for receiving the tool, and in their tapered formation, and this adapter is designed so that the tool may be mounted upon all of such shafts or spindles.

The adapter comprises, essentially, a sleeve 10 having an interior diameter of sufficient size to be placed over any one of the variously sized axle shafts or spindles which will ordinarily be encountered. Rotatably mounted upon the sleeve are rings 11 and 12 having exterior bearing surfaces designed to nicely fit the hub 4 so that the tool can be rotatably mounted thereon.

Adjustable devices are provided so that the sleeve 10 may be mounted on variously sized spindles or shafts. As shown herein these devices comprise plungers reciprocably mounted in the sleeve 10, there being two sets of plungers, preferably, and three to a set. The plungers are illustrated at 13. These plungers are preferably normally held radially outward, and this may be accomplished by leaf springs 14. Each is secured intermediate its length to the sleeve 10, as by means of bolts or the like 15, and having an aperture in each end through which the plungers extend. The plungers are shouldered, as at 16, for this purpose. The rings 11 and 12 are undercut and provided with cam faces 17 so that upon relative rotation between the sleeve and ring the plungers are engaged by the cams and urged radially inwardly against the action of the springs 14. The rings may advantageously be held in position on the sleeve by means of the sleeve being provided with a groove 18 for the reception of the end of one or more screws 19 having a part designed to run in the groove.

The cam faces upon the two rings 11 and 12 are preferably arranged so that the respective plungers engaged thereby are urged inwardly as the rings are rotated in opposite directions relative to the sleeve 10. In conjunction with this arrangement a coil spring 20 may be disposed between the sleeves having its ends connected to the sleeves, as shown in Fig. 2, and the tendency of this spring is to normally hold the rings in a position so that the plungers are disposed inwardly towards the axial center of the sleeve 10. The tension of the spring of course tends to rotate the rings in opposite directions.

The sleeve 10 may advantageously be split, as at 21, to provide for a setting of the adjustment, and the portions facing the slit are shaped to permit the passage therethrough from end to end of the sleeve of the rod 22, having at one end a wedge 23. The wedge may be integral with the rod or otherwise secured thereto. The opposite end of the rod is screw threaded for the reception of an operable nut 24 having a wedge portion 25.

This adapter may be applied to any spindle, axle shaft, arbor, or the like within the limits of the adapter construction which, however, is such as to accommodate for all spindles, axle shafts and arbors ordinarily encountered. To apply the adapter to one of the above mentioned elements, the same is placed over the element, as shown in Fig. 1. Inasmuch as the spring 20 holds the plungers inwardly, it may be necessary to rotate the rings somewhat so as to permit the plungers to recede radially outward and thereby fit over the shaft. When this is done the rings are rotated to urge the plungers inward into engagement with the shaft. It will be noted that the rings are independently rotatable so that one set of plungers may fit upon a shaft portion having a diameter greater or less than the other. This is clearly shown in Fig. 1. With the plungers thus adjusted to the shaft, the thumb screw, or nut 24 is tightened expanding sleeve 10 against rings 11 and 12 thus resisting relative rotation between sleeve and rings so that the adapter as a unit is maintained upon the axis providing member. The brake gauge 2 may now be slipped over the rings and used in a manner well known to those versed in the art.

Sometimes an axis-providing member will be encountered, the available length of which is not sufficient to permit the adapter to be placed thereon. In other words, the distance between the two sets and plungers of the adapter is too great for the available length of the axis-providing member. Accordingly, it is advantageous to provide the adapter, or rather the sleeve 10, with a series of apertures 30 for receiving plungers, and associated with each aperture a leaf spring 31 having a hole 32 through which the plungers may extend. These apertures may advantageously be three in number and circumferentially spaced between the other plunger-receiving apertures and springs. This construction may be termed an auxiliary plunger-receiving arrangement, and a set of plungers may be readily disposed in the apertures 30 and acted upon by the springs 31 in a manner similar to springs 14. In this event another ring element may be employed in place of either ring element 11 or 12 which is proportioned to act upon the plungers located in the central apertures 30. It will be noted that the adapter bushing is very accurately fitted because of the three-point contact provided by the sets of plungers.

We claim:

1. An adapter device for rotatably mounting a hubbed element on variously sized spindles or shafts, comprising a sleeve, radially adjustable members carried thereby, cam means including a pair of rings disposed on the outside of the sleeve and rotatably movable for adjusting said radially movable members, and bearing surfaces on the exterior of the rings for the reception of the hubbed element.

2. An adapter device for rotatably mounting a hubbed element on variously sized spindles or shafts, comprising a sleeve, radially adjustable members carried thereby, cam means including a pair of spaced rings disposed on the outside of the sleeve and rotatably movable for adjusting said radially movable members, bearing surfaces on the exterior of the rings for the reception of the hubbed element, and means for holding the rings fixed in adjusted position.

3. An adapter device for rotatably mounting a hubbed element on variously sized spindles or shafts, comprising a sleeve, radially adjustable members carried thereby, cam means including a pair of spaced rings disposed on the outside of the sleeve and rotatably movable for adjusting said radially movable members, bearing surfaces on the exterior of the rings for the reception of the hubbed element, said sleeve being split lengthwise, and means to expand it against the rings to hold them in adjusted position.

4. An adapter device for rotatably mounting a hubbed element on variously sized spindles or shafts, comprising a sleeve, radially adjustable members carried thereby, cam means including a pair of spaced rings disposed on the outside of the sleeve and rotatably movable for adjusting said radially movable members, bearing surfaces on the exterior of the rings for the reception of the hubbed element, said sleeve being split lengthwise, and wedge means for expanding the sleeve against the rings to hold them in adjusted position.

5. A device substantially for the purpose described, comprising a sleeve having apertures therein, plungers carried in the apertures and projecting through the sleeve walls, means tending normally to hold the plungers radially outward, means exterior of the sleeve for adjusting the plungers inwardly, and means mounted on the sleeve providing an exterior surface adapted to receive an element to be rotatably mounted thereon.

6. A device substantially for the purpose described, comprising a sleeve having apertures therein, plungers carried in the apertures and projecting through the sleeve walls, spring means tending normally to hold the plungers radially outward, cam elements mounted outside the sleeve and rotatable to move the plungers inwardly against the spring means.

7. A device substantially for the purpose described, comprising a sleeve having apertures therein, plungers carried in the apertures and projecting through the sleeve walls, spring means tending normally to hold the plungers radially outward, cam elements mounted outside the sleeve and rotatable to move the plungers inwardly against the spring means, and means for holding the cam members in adjusted position.

8. A device substantially for the purpose described, comprising a sleeve having apertures therein, plungers carried in the apertures and projecting through the sleeve walls, spring means tending normally to hold the plungers radially outward, cam elements mounted outside the sleeve and rotatable to move the plungers inwardly against the spring means, means for holding the cam members in adjusted position, said cam members comprising ring elements having exterior bearing surfaces for the reception of an element to be rotatably mounted thereon.

9. A device substantially for the purpose described, comprising a split sleeve, radially movable plungers carried by the sleeve, rings outside the sleeve having cam surfaces for engaging the plungers, said rings being rotatable to adjust the plungers, spring means for holding the plungers against said cam faces, and means for expanding the split sleeve to hold the rings in adjusted position.

10. A device substantially for the purpose described comprising a sleeve, two sets of axially spaced plungers carried by the sleeve, there being three plungers to a set, rotatable rings carried by the sleeve having cam faces for radially adjusting the sets of plungers to seat them on a spindle or shaft, each set with three-point contact, said sleeve being split, means for expanding the sleeve against the rings to hold them in adjusted position, and bearing surfaces on said rings for the reception of an element to be rotatably mounted thereon.

11. In a gauge of the kind described, a structure comprising a sleeve adapted to loosely fit over a wheel spindle and a plurality of devices associated with the sleeve, said devices adapted to be brought into engagement with circumferentially spaced portions of the spindle to simultaneously center and clamp the sleeve upon the spindle, cam means for actuating the devices simultaneously, an arm rotatably mounted upon said structure to extend normal to the axis of the spindle, and a gauge carried by said arm.

12. In a device of the class described, a structure having a central opening therethrough adapted to receive a wheel spindle, said structure comprising a plurality of sets of members, one set at each end of said opening and the members of each set being positioned equidistant about the periphery of and extending into said opening and movable radially with respect thereto, said structure also including means having cam surfaces, adapted when actuated to force said members inwardly of said opening whereby said structure may be clamped upon spindles of various dimensions, said structure being further provided with an exteriorly positioned bearing surface concentric with the spindle upon which said structure is clamped; an element adapted to be rotatably mounted upon said bearing surface, a support carried by said element and extending radially outwardly of said bearing surface, and a gauge member adjustably carried by said support.

13. In combination a brake lining gauge and a gauge supporting chuck, said chuck comprising cylindrical housing-sections, each section being provided with inwardly directed, symmetrically arranged cam formations, a keeper adapted to be enclosed within the housing sections and provided with pockets arranged radially and relatively with the cam formations, elements seated in the pockets to cooperate with the cam formations, and spring means for causing oppositely directed rotative tension upon the respective housing-sections.

14. In a device for use in the installation of brake linings for vehicle wheels a structure comprising a sleeve adapted to loosely fit over a wheel spindle and a plurality of devices associated with the sleeve, said devices adapted to be brought into engagement with circumferentially spaced portions of the spindle to simultaneously center and clamp the sleeve upon the spindle, cam means for actuating the devices simultaneously, an arm rotatably mounted upon said structure to extend normal to the axis of the spindle, and an instrument for acting upon the adjacent brake lining material, said instrument being carried by the arm and positioned so as to overlie said adjacent brake lining.

15. A device for use in the installation of brake linings for vehicle wheels comprising a structure having a central opening therethrough adapted to receive a wheel spindle, said structure comprising a plurality of sets of members, one set at each end of said opening and the members of each set being positioned equidistant about the periphery of and extending into said opening and movable radially with respect thereto, said structure also including means having cam surfaces, adapted when actuated to force said members inwardly of said opening whereby said structure may be clamped upon spindles of various dimensions, said structure being further provided with an exteriorly positioned bearing surface concentric with the spindle upon which said structure is clamped; an element adapted to be rotatably mounted upon said bearing surface, a support carried by said element and extending radially outwardly of said bearing surface, an instrument adapted for use in truing the brake linings and positioned to extend substantially parallel to the spindle axis so as to overlie the adjacent brake lining material, and means for adjustably mounting the instrument on the support.

ALVIN L. MILLER.
RUSSELL H. MILLER.